United States Patent [19]
Mefford

[11] Patent Number: 6,073,743
[45] Date of Patent: Jun. 13, 2000

[54] CASE FLOW SYSTEM

[75] Inventor: Roger W. Mefford, Andover, N.J.

[73] Assignee: Frazier Industrial Company, Long Valley, N.J.

[21] Appl. No.: 09/241,983

[22] Filed: Feb. 2, 1999

[51] Int. Cl.$^7$ .............................. B65G 13/12; A47F 1/04
[52] U.S. Cl. ........................................ 193/35 R; 211/59.2
[58] Field of Search .................................. 414/276, 267, 414/286; 211/151, 59.2; 193/35 R, 37

[56] References Cited

U.S. PATENT DOCUMENTS

| | | | |
|---|---|---|---|
| 1,455,977 | 5/1923 | Wentz | 193/35 R |
| 3,840,102 | 10/1974 | Dawson | 193/35 R |
| 4,067,428 | 1/1978 | Shuttleworth | 193/35 R |
| 4,294,363 | 10/1981 | Oztekin et al. | 211/59.2 |
| 4,394,910 | 7/1983 | Miller | 211/59.2 |
| 4,411,349 | 10/1983 | Stedman et al. | 193/35 R |
| 4,765,493 | 8/1988 | Kinney | 193/35 R |
| 5,115,920 | 5/1992 | Tipton et al. | 211/59.2 |
| 5,123,517 | 6/1992 | Windau | 414/276 |
| 5,312,004 | 5/1994 | Krummell et al. | 211/59.2 |
| 5,350,048 | 9/1994 | Wylie | 193/35 R |
| 5,476,167 | 12/1995 | Highsmith | 193/35 R |

*Primary Examiner*—Steven A. Bratlie
*Attorney, Agent, or Firm*—Joseph W. Molasky & Associates

[57] ABSTRACT

A case flow system consisting essentially of a roller bed arrangement equipped with a plurality of independent wheels disposed in a spaced-apart relationship along a set of steel axles joined to a pair of side rails. A plurality of inverted generally U-shaped support members extends from the rear to the front of each bed and is located adjacent to the wheels. A set of cross beams are disposed underneath and in contact with the support members so that the load on the bed may be transferred from the support members to the side rails while simultaneously reducing the load on the axles. The improvement in weight distribution is such that bearingless, inexpensive wheels may be used.

20 Claims, 3 Drawing Sheets

CASE FLOW SYSTEM

BACKGROUND OF THE INVENTION

The present invention relates to a case flow system and, more particularly, to an improved case flow structure equipped with a plurality of wheels which are supported on steel axles joined to a pair of correlative side rails. Wheel spacers and support members are disposed between adjacent wheels, and these act in concert with the wheels and axles to transfer the weight of the product which is being loaded across the span of the structure and onto the side rails.

There is a variety of case flow systems currently in use for managing inventory. Such systems are often referred to as "gravity flow" in that each shelf is inclined and includes rollers, wheels, or other movement mechanisms that allow product (such as cartons or cases, hereinafter referred to generally as "cases") to be loaded from the rear and "flow", via gravity, to the front of the storage structure. One conventional structure utilizes a single column of plastic wheels, supported on plastic axles. A case flow system is then formed by building a structure to include the desired number of columns. One problem with this arrangement is that the plastic axles shear easily, and this results usually in the loss of one (or more) wheels along the length of each column. Also, the single column of wheels may come loose, twist, or buckle, and thus require replacement. Further, if case sizes are changed, additional wheel columns may be needed to complete the flow system.

An alternative case flow design utilizes a steel axle to support a single, extended cylindrical roller (in lieu of a number of separate wheels.) Although such a system is more rigid than the plastic design, its dimensions are dictated by the size of the rollers, and this only serves to make the structure more difficult to modify once in place.

Accordingly, there is a need in the art for a case flow system that is structurally superior to known plastic wheel/plastic axle arrangements and more flexible in design and re-configuration than prior roller arrangements.

SUMMARY OF THE INVENTION

The present invention overcomes the difficulties associated with known prior art systems. More particularly, it provides for an improved case flow system which utilizes independent, inexpensive wheels supported on steel axles between side rails and, also, it incorporates wheel spacers and support members disposed between adjacent wheels to transfer the load of the supported cases across the span of the structure to the side rails.

In accordance with the present invention, the case flow system utilizes inverted generally U-shaped support members that are disposed parallel to and spaced apart from the side rails. This U-shaped design is characterized by a central horizontal portion which is essentially flat and has the salutary effect of significantly reducing the collection of debris and spill which is endemic to known systems. The support members include apertures that allow for a single steel axle to be passed through the members and thus span the entire width of the system from side rail to side rail. In a preferred embodiment, each wheel spacer comprises a cylindrical element which essentially covers that portion of the axle which lies between a wheel and a support member, thereby maintaining each wheel in relative proximity to an adjacent support member and preventing lateral motion of the wheel along the axle.

A number of cross beams, disposed between the side rails, are located underneath the wheel/axle assembly, and these are positioned in such manner as to contact the open ends of the U-shaped support members. Therefore, any force which results from loaded cases is transferred from the wheels to the steel axle, then to the U-shaped support members, the cross beams and, ultimately, to the side rails (which are supported at each end.) The axles are therefore not compromised by the load and are less likely to bend and incur damage that is the case with known prior art arrangements.

The case flow system of the present invention may also be modified to include guide rails, disposed from the back to the front of the roller bed, as an aid to proper case placement (i.e., to urge a case load into the correct "channel" along the width of the roller bed.)

Further features and advantages of the present invention will become apparent from the following discussion and the accompanying drawings.

BRIEF DESCRIPTION OF THE DRAWINGS

Referring now to the drawings.

DETAILED DESCRIPTION OF THE PREFERRED EMBODIMENT

Figure 1:
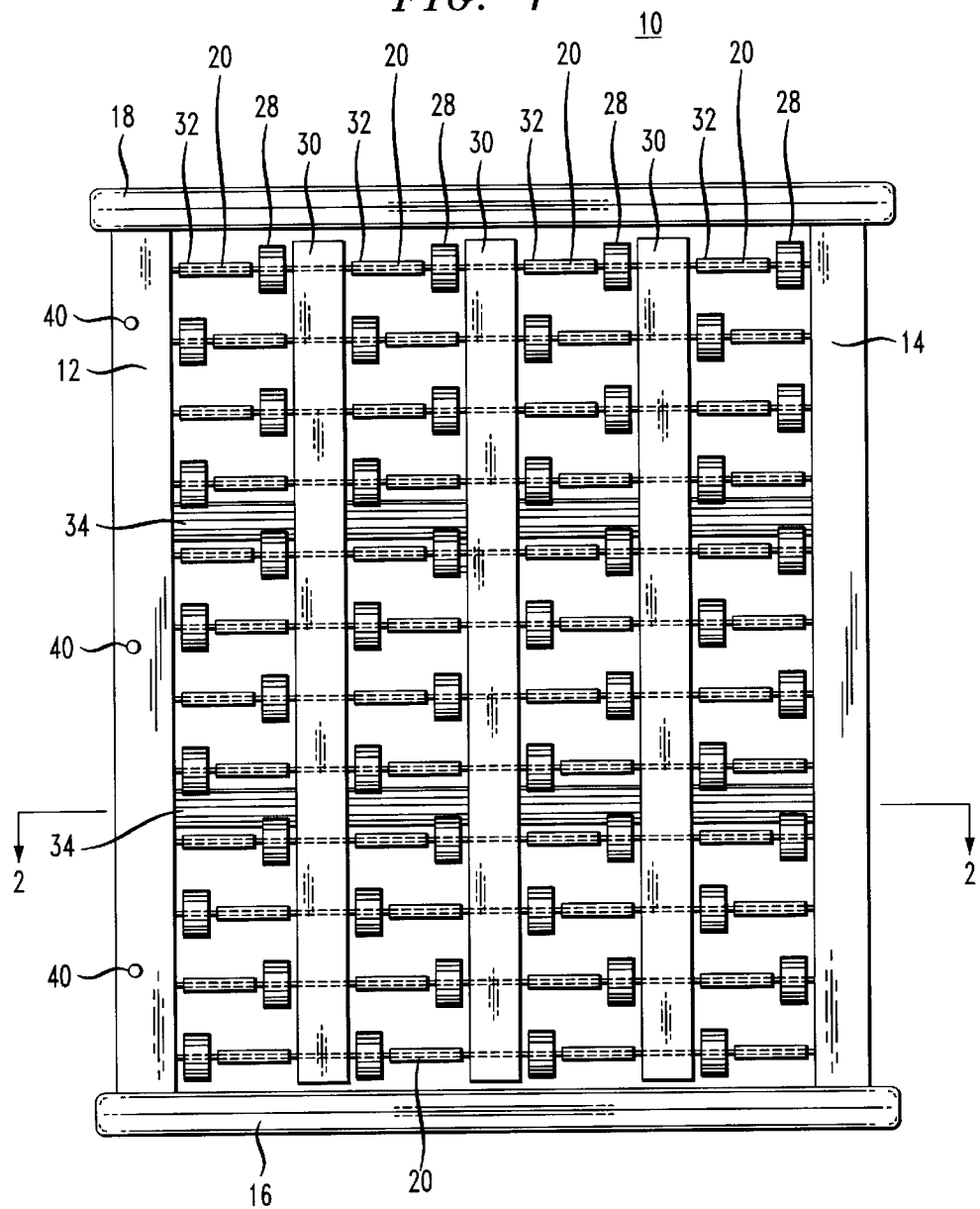
FIG. 1 illustrates a top view of an exemplary case flow roller bed formed in accordance with the present invention.

FIG. 1 contains a top view of an exemplary roller bed 10 illustrating the case flow system of the present invention. As shown, roller bed 10 comprises a pair of side rails 12 and 14, separated by a predetermined distance chosen to define the span of roller bed 10. An advantage of the arrangement of the present invention is that the span is not limited by piece part dimensions, as is the case for the prior art roller case flow structure. That is, an exemplary roller bed formed in accordance with the present invention may be extended to any desired width, using an appropriate number of wheels and support members to span the width. The roller bed can thereafter be modified by increasing or decreasing the number of wheels and support members between the side rails.

Referring to FIG. 1, a front rail beam 16 supports the first ends of side rails 12,14 and, similarly, a rear rail beam 18 supports the opposing ends of side rails 12,14. Front rail beam 16, as shown in particular in the isometric view of FIG. 3, extends above the profile of side rails 12,14 to act as a "stop" for cases traveling along roller bed 10. Roller bed 10 also includes, as shown in FIG. 1, a plurality of steel axles 20 that extend from side rail 12 to side rail 14. As clearly shown in the cut-away side view of FIG. 2, only one end of each axle 20 has a head 22. The head is captured by a containment angle 26. Containment angle 26 prevents accidental removal of the axles, yet allows for easy assembly. Containment angle 26 is attached to side rail 12 by a minimal number of bolts 40, allowing the wheels to spin freely. Additionally, this minimal number of bolts 40 allows for easy and positive assembly, as well as easy removal of independent axles if repair is needed. In the final structure, therefore, the set of axle bolts 24 is positioned below the flange of side rails 12,14 and is not exposed so that they are protected always from accidental contact and damage.

Also, FIG. 1 shows in detail how, in each roller bed, a set of wheels 28 and an associated set of support members 30 are disposed in a predetermined pattern along each axle 20. The placement of the components along the axle, as well as the separation between adjacent axles, is carefully made so as to provide an essentially uniform spacing between adjacent wheels. Since each axle 20 is not bolted to parallel side rails (as is the case for prior art designs), wheels 28 do not require bearings and can thus comprise relatively simple and inexpensive plastic wheel designs. A set of spacers 32 are used to prevent lateral motion of wheels 28, where spacers 32 comprise cylindrical covers disposed over axle 20 so as to be contiguous with each wheel 28 in a row. As shown in FIG. 1, the spacers, wheels and support members are arranged such that each wheel is adjacent to a support member (or a side rail at either end of the row.) This arrangement is considered an improvement over certain prior art designs that include wheels disposed in a central position between support members, thereby putting a load on the axle and causing unwanted bending and eventual breakage. The dimensions of all components are discretionary on the part of the user. In one embodiment, inverted U-shaped support members 30 may comprise a width of approximately one inch when handling relatively small cases or, alternatively, may comprise a width of more than two inches when handling larger cases. Side rails 12,14 may have a height as short as 1 ½" for light loads and relatively small spans, or may be increased to approximately three inches for heavier loads and longer spans. The wheels may be disposed so that the maximum spacing between adjacent wheels is approximately 3.5", allowing cases as small as 7" in width to easily flow anywhere along the length of the roller bed. Any other suitable dimensions are possible and all are considered to fall within the spirit and scope of the present invention. In the present invention, the force applied to the case flow structure by the loaded goods is transferred from support members 30 to a set of underlying cross beams 34.

Figure 2:
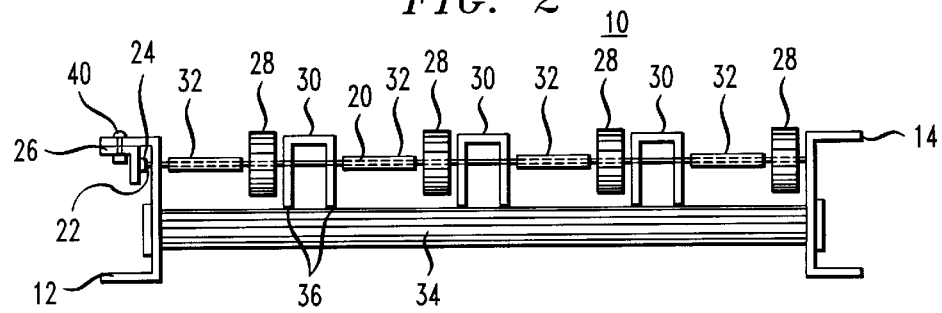
FIG. 2 is a cut-away side view of the roller bed of FIG. 1.

FIG. 2 is a cut-away view of roller bed 10 and illustrates the positioning of an exemplary cross beam 34 with respect to support members 30. The cross beams 34 hold the assembly together; they are attached between first side rail 12 and second side rail 14 and positioned so that the open end 36 of each support member 30 rests upon the top surface of the cross beam. An applied force, therefore, will be transferred from support members 30 to cross beams 34, and then to side rails 12 and 14. No load is therefore required to be supported by axles 20 and wheels 28, thus extending the life of the roller bed structure and significantly reducing the possibility that the axles may be damaged or sheared off (as is common in prior art systems.)

In a preferred arrangement of the present invention, as illustrated in FIG. 1, the wheel pattern is "staggered"; that is, the location of wheels 28 with respect to support members 30 is alternated between rows. This staggered pattern provides the greatest flexibility because it allows an exemplary roller bed to carry cases of varying dimensions. With this arrangement, a package of minimum width 2d may be carried, if "d" is defined as the spacing between wheels as shown. It is to be understood, however, that many other arrangements are possible, and all are considered as falling within the spirit and scope of the present invention. For example, the wheels may be disposed in a uniform fashion in each row, or additional wheels may be disposed on either side of each support member.

Figure 3:
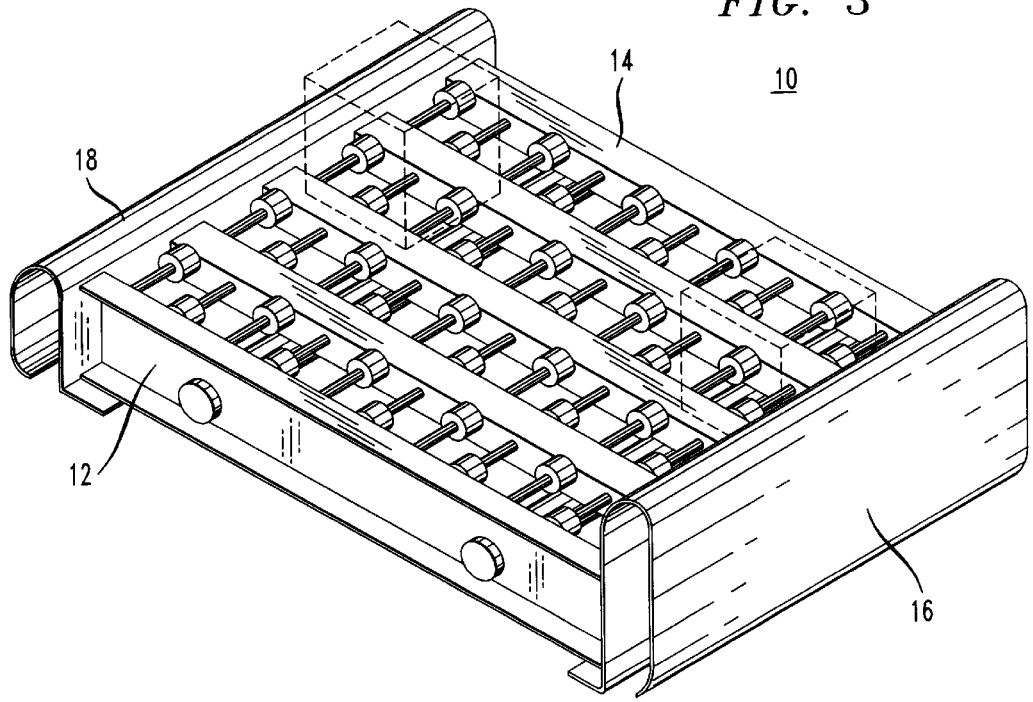
FIG. 3 contains an isometric view of the case flow roller bed of FIG. 1.

An isometric view of roller bed 10 is shown in FIG. 3, and this illustration clearly depicts the raised profile of front rail beam 16. In one embodiment, beam 16 may comprise a galvanized pipe that has been "squeezed" to have an oval profile, thus eliminating all sharp edges and allowing for easy label placement along any appropriate surface. A telescoping member (not shown) may be inserted in either end of such a beam and used to adjust the width of the front rail beam to accommodate the span between braces in a rack structure, such as the rack structure illustrated in FIG. 4. A conventional pipe (also "squeezed" to an oval-shape) or a channel member may also be used as an alternative for front rail beam 16. In FIG. 3, the movement of an exemplary case is illustrated in phantom on roller bed 10, and it also shows clearly the use of the raised profile of front beam 16 as a stop for the case.

Figure 4:
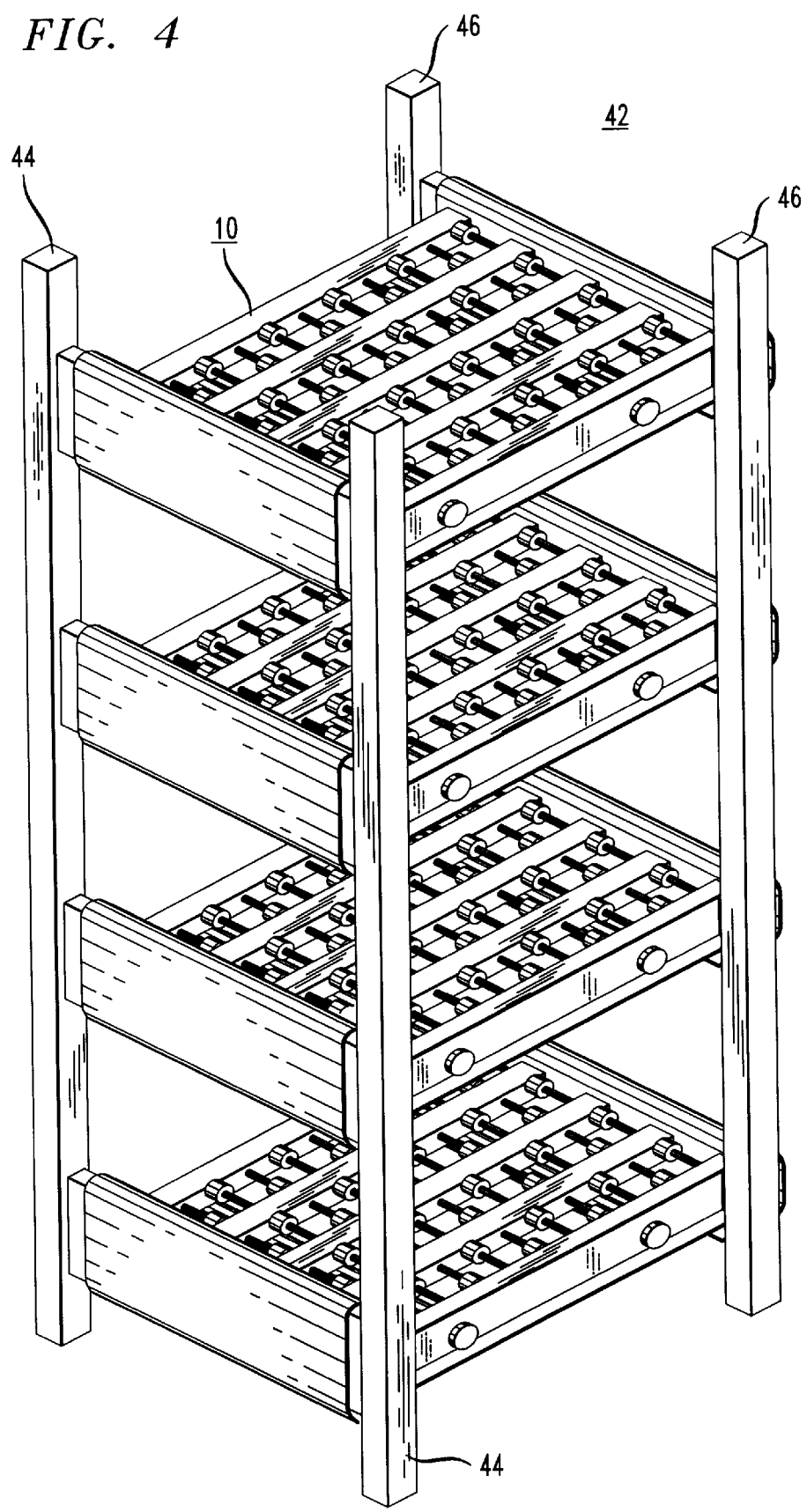
FIG. 4 illustrates an exemplary case flow system utilizing a plurality of roller beds formed as shown in FIG. 1.

An exemplary case flow rack 42 equipped with a plurality of roller beds 10 and formed in accordance with the present invention is illustrated in FIG. 4. Rack system 42, as shown, includes a set of four roller beds attached between a pair of front columns 44 and a pair of rear columns 46. The arrangement as shown in FIG. 4 is considered exemplary only and any desired number of beds may be included.

One advantage of the roller bed of the present invention is its relatively low profile; a feature which makes it possible to maximize the number of roller beds within a rack.

Still another advantage is stackability, that is, the case with which racks of roller beds can be stacked alongside one another in side-by-side fashion to provide shelves of almost any desired width.

Figure 5:
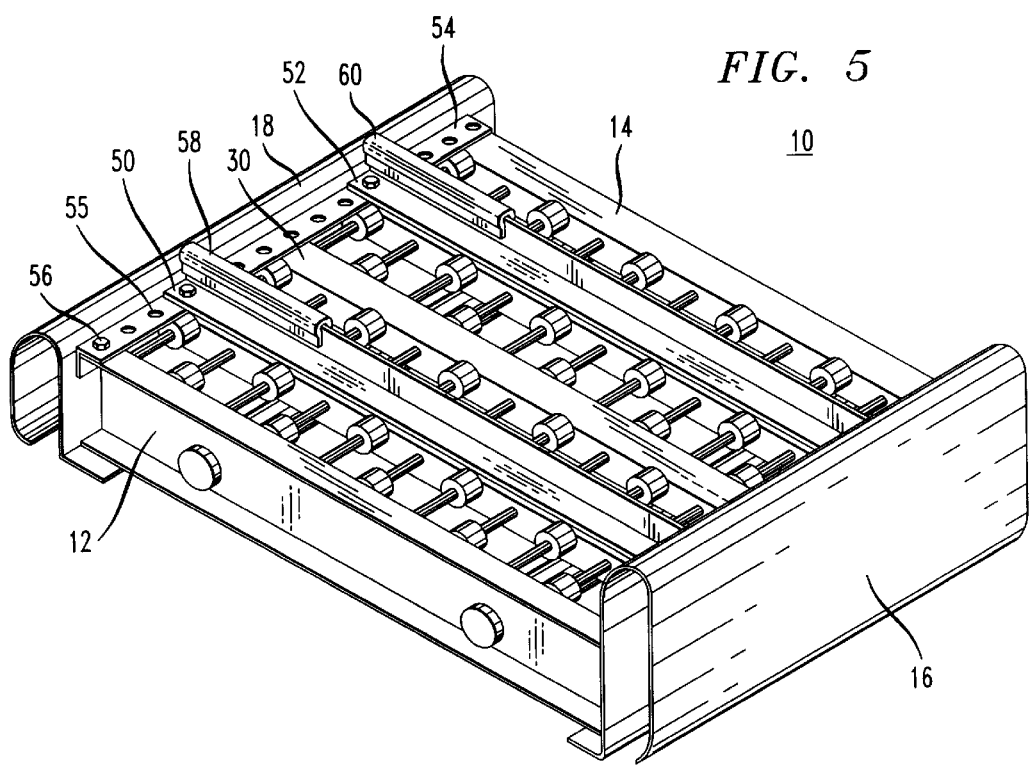
FIG. 5 is an isometric view of an exemplary roller bed equipped with a pair of full length guides for assisting in the proper placement of cases onto the roller bed.

In some instances, particularly in arrangements which employ a relatively wide roller bed, it may be convenient to include means for defining different "lanes" along the roller bed's length. FIG. 5 is typical of such an arrangement; it shows an isometric view of an exemplary roller bed 10 comprised of a pair of lane guides 50, 52, where each guide is comprised of an angle piece attached to a guide spacer 54. Guide spacer 54 may either replace rear rail beam 18 or it may be disposed in such manner as to cover beam 18. In a preferred embodiment, guide spacer 54 includes a number of apertures 55 so that the relative positioning of the first and second lane guides 50 and 52 is adjustable. In this connection, it should also be noted that any desired number of lane guides may be used with the roller bed of the present inventions the pair of lane guides shown in FIG. 5 being exemplary only. As shown, guide spacer 54 is attached to side rails 12 and 14 by bolt means 56. First lane guide 50 is bolted to guide spacer 54 through a chosen aperture 55. Second lane guide 52 is then similarly bolted, in a spaced-apart arrangement, through another selected aperture 55. If either lane guide is disposed over a support member 30, the guide may also be attached to the support member. Advantageously, either leg of the angle pieces used to form the lane guides includes apertures at each end, thus facilitating the attachment of the lane guide in either orientation to the roller bed. As an additional feature, an entry spacer 58,60 may be inserted over the "loading" end of lane guides 50 and 52, respectively. These entry spacers 58,60 are formed from plastic or other suitable material such as nylon or the like, and their purpose is to ensure that cases which are loaded onto the roller bed do not come into damaging contact with the lane guides.

While the preferred embodiments have been fully described and depicted for the purposes of explaining the principles of the present invention, it will be appreciated by those skilled in the art that modifications and changes may be made thereto without departing from the spirit and scope of the invention set forth in the appended claims.

What is claimed is:

1. A case flow roller bed comprising a pair of side rails separated by a predetermined distance;

a front rail beam supporting a first end of each side rail of said pair of side rails, said front beam including a raised end surface;

a rear rail beam supporting the opposing ends of each side rail of said pair of side rails;

at least two cross beams disposed parallel to said front and rear rail beams and attached to said pair of side rails;

a plurality of axles disposed between said side rails, each axle attached to one side rail of said pair of side rails;

a plurality of wheels disposed in a spaced-apart pattern along each axle of said plurality of axles;

a plurality of support members disposed contiguous with each wheel of said plurality of wheels, each support member extending from the rear rail beam to the front rail beam so as to be parallel with said pair of side rails and formed to extend downward to contact said at least two cross beams; and a plurality of wheel spacers disposed to cover said axle and sized to maintain each wheel in its contiguous relationship with its associated support member.

2. A roller bed as defined in claim 1 wherein each axle comprises a steel axle.

3. A roller bed as defined in claim 1 wherein each wheel comprises a bearingless, plastic wheel.

4. A roller bed as defined in claim 1 wherein each support member comprises an inverted generally U-shaped member having a central horizontal portion and a pair of downwardly extending leg portions, the pair of downwardly extending leg portions resting upon said at least one cross beam.

5. A roller bed as defined in claim 1 wherein the at least two cross beams comprises a plurality of cross beams.

6. A roller bed as defined in claim 1 wherein each cross beam comprises a cylindrical member.

7. A roller bed as defined in claim 1 wherein the roller bed further comprises at least two lane guides, each lane guide being attached between the rear rail and front rail, said two lane guides being separated by a predetermined distance sufficient to form a case flow lane of a desired width.

8. A roller bed as defined in claim 7 wherein the roller bed further comprises a guide spacer disposed over and attached to said rear rail beam, said guide spacer including a plurality of apertures such that said two lane guides are attached to said guide spacer at a pair of predefined apertures.

9. A roller bed as defined in claim 7 wherein each guide of the two lane guides further comprises an entry spacer disposed over one end of said guide at the rear rail beam location, said entry spacer extending a predetermined distance along the length of each guide.

10. A roller bed as defined in claim 9 wherein each entry spacer comprises a plastic cap arrangement for covering the rear end of each guide.

11. A roller bed as defined in claim 7 wherein each guide comprises an angle piece.

12. A case flow system comprising a rack structure including a pair of front columns and a pair of rear columns; and a plurality of roller beds disposed between and attached to said pair of front columns and said pair of rear columns, each roller bed comprising a pair of side rails separated by a predetermined distance;

a front rail beam supporting a first end of each side rail of said pair of side rails, said front beam including a raised end surface;

a rear rail beam supporting the opposing ends of each side rail of said pair of side rails;

at least two cross beams disposed parallel to said front and rear rail beams and attached to said pair of side rails;

a plurality of axles disposed between said side rails, each axle attached to one side rail of said pair of side rails;

a plurality of wheels disposed in a spaced-apart pattern along each axle of said plurality of axles;

a plurality of support members disposed contiguous with each wheel of said plurality of wheels, each support member extending from the rear rail beam to the front rail beam so as to be parallel with said pair of side rails and formed to extend downward to contact said at least two cross beams; and a plurality of wheel spacers disposed to cover said axle and sized to maintain each wheel in its contiguous relationship with its associated support member.

13. A case flow system as defined in claim 12 wherein each axle comprises a steel axle.

14. A case flow system as defined in claim 12 wherein each wheel comprises a bearingless, plastic wheel.

15. A case flow system as defined in claim 12 wherein each support member comprises an inverted generally U-shaped member having a central horizontal portion and a pair of downwardly extending leg portions, the pair of downwardly extending leg portions resting upon said at least two cross beams.

16. A case flow system as defined in claim 12 wherein the at least two cross beams comprises a plurality of cross beams.

17. A case flow system as defined in claim 12 wherein each cross beam comprises a cylindrical member.

18. A case flow system as defined in claim 12 wherein at least one roller bed further comprises at least two lane guides, each lane guide attached between the rear rail and front rail, said at least two lane guides separated by a predetermined distance sufficient to form a case flow lane of a desired width.

19. A case flow system as defined in claim 18 wherein the at least one roller bed further comprises a guide spacer disposed over and attached to said rear rail beam, said guide spacer including a plurality of apertures such that said at least two lane guides are attached to said guide spacer at a pair of predefined apertures.

20. A roller bed as defined in claim 18 wherein each guide of the at least two guides further comprises an entry spacer disposed over one end said guide at the rear rail beam location, said entry spacer extending a predetermined distance along the length of each guide.

* * * * *